United States Patent [19]

Hopwood et al.

[11] Patent Number: 4,847,624
[45] Date of Patent: Jul. 11, 1989

[54] COORDINATE SYSTEM TRANSFORMATION APPARATUS FOR A HIGH RESOLUTION RADAR

[75] Inventors: Francis W. Hopwood, Severna Park; Jerry A. Kane, Crofton; George A. Ioannidis, Bel Air; Martin J. Decker, Baltimore, all of Md.

[73] Assignee: Westinghouse Electric Corp., Pittsburgh, Pa.

[21] Appl. No.: 139,512

[22] Filed: Dec. 30, 1987

[51] Int. Cl.⁴ .................. G01S 13/90; G01S 7/44
[52] U.S. Cl. .................................. 342/201; 342/204; 342/25
[58] Field of Search .............. 342/200, 201, 202, 204, 342/25, 179

[56] References Cited

U.S. PATENT DOCUMENTS

| | | | |
|---|---|---|---|
| 3,216,013 | 11/1965 | Thor | 342/204 |
| 3,992,707 | 11/1976 | Schmidtlein et al. | 342/185 |
| 4,002,827 | 1/1977 | Nevin et al. | 342/185 |
| 4,160,958 | 7/1979 | Mims et al. | 331/178 |
| 4,186,397 | 1/1980 | Sternberger et al. | 342/128 X |
| 4,245,250 | 1/1981 | Tiemann | 342/185 X |
| 4,310,907 | 1/1982 | Tachita et al. | 342/185 X |
| 4,321,601 | 5/1982 | Richman | 342/25 |
| 4,386,529 | 6/1983 | Engle | 73/606 |
| 4,611,208 | 9/1986 | Kane et al. | 342/25 |
| 4,724,418 | 2/1988 | Weindling | 342/25 |

*Primary Examiner*—Thomas H. Tarcza
*Assistant Examiner*—Gilberto Barròn, Jr.
*Attorney, Agent, or Firm*—W. G. Sutcliff

[57] ABSTRACT

The present invention includes an apparatus that prebiases a transmitted radar signal. The prebiasing of the transmit signal automatically aligns the return signals in one dimension or dimensionally transforms the return signals thereby removing the need for one of the dimensional processing operations of a conventional two dimensional return signal interpolator. A map function generator produces small frequency (phase) changes in the transmitted signal during each pulse over the entire integration or exposure period. The map function generator produces a parabolic frequency change control signal applied during the integration period. The control signal is divided into segments where each segment controls a single transmit pulse. The control signal modifies a linear frequency modulation control signal. conventionally produced by high resolution radar systems.

6 Claims, 4 Drawing Sheets

COORDINATE SYSTEM TRANSFORMATION APPARATUS FOR A HIGH RESOLUTION RADAR

CROSS REFERENCE TO RELATED DISCLOSURES

This application is related to U.S. Pat. No. 4,160,958 entitled "Sampling Linearizer Utilizing A Phase Shifter" by Mims et al. assigned to Westinghouse Electric Corporation and incorporated by reference herein.

BACKGROUD OF THE INVENTION

1. Field of the Invention

The present invention is directed to a transmit signal prebiasing device for a high resolution radar system that transforms the received signal into a different coordinate system to aid in received signal processing and, more particularly, to a parabolic shaped frequency control signal applied during an image integration period that allows the image signals to be rectilinearized using a one dimensional interpolator.

2. Description of the Related Art

High resolution radar uses polar format signal processing or an equivalanet technique to achieve well focused images over large image fields. Polar format solves a phenomenon known as "range migration". The range resolution δr and azimuth resolution δa of an imaging radar are well known to be:

$$\delta r = \frac{Wr\, C}{2B} \tag{1}$$

$$\delta a = \frac{Wa\, \lambda}{2\Theta}$$

where B is the transmitted bandwidth, λ is transmitted wavelength, C is the speed of light, Wr and Wa are weighting function broadening factors and Θ is the angle of rotation of the object field relative to the radar sensor. These well established principles show that achieving range resolution requires a minimum transmitted bandwidth and that achieving azimuth or cross range resolution requires a minimum relative angular rotation between the object field and the sensor. Range migration becomes an issue when the angular motion required for azimuth resolution causes objects at the cross range edges of the object field to change their range relative to the sensor by more than a range cell. This occurs when X*Θ>δr or X/δr>F/B where +/−X is the cross range dimension of the image field and F is the transmit frequency. For example, if Wr and Wa are 1.2, B is 600 MHz, C is 1.0 ft/ns, then δr is 1 ft. For an X band radar where F is $10^{10}$ Hz, the required angular rotation for 1 ft azimuth resolution (δr) is 0.024 radians or 3.6 degrees. If the cross range dimension of the object field is +/−500 feet, objects at the edge of the field move in range with respect to the sensor by 500 * 0.024=12 feet. Since the range resolution is 1 ft, the object migrates through 12 range cells during the azimuth integration time. If the resultant signals were processed without compensating for this migration, objects at the cross range extremes of the image field (and in fact most of the field) would be smeared over multiple range cells and the image would be badly defocused.

FIG. 1 shows the architecture of a conventional high resolution imaging radar system that includes a sensor 10 and a signal processor 12 where the sensor 10 is in an aircraft and the processor 12 is either in the aircraft or it is on the ground and communicates with the sensor 10 via a data link 14.

The sensor 10 includes a linearizer 16 with a synchronizer 18 which produces phase shift data which linearly modulates the transmit waveform through a waveform generator 20. The waveform generator 20 produces a control signal for transmitter 22 which outputs radar pulses toward the targer through antenna 24. The return signals are applied to receiver 26 which, through data link 14, sends the digitized received signals to the processor 12. The sensor 10 uses the commonly practiced "stretch" waveforms where the transmitted pulse is modulated with linear frequency modulation (LFM) by the linearizer 18, as described in detail in U.S. Pat No. 4,160,958. Received signals are mixed with a delayed replica of the transmitted waveform in receiver 26, resulting in a receiver output signal with components whose frequencies are proportional to the range of individual scatterers. Other frequency components are due to sensor motion.

A map reference function generator 28 in the processor 12 computes the phase of the return signal from the center of the imaged field, accounting for sensor motion (changes in speed and altitude of the platform), substract it from the received data, thereby stabilizing the data and preparing it for further processing. If the image field were small or the resolution coarse, the stabilized data could be directly Fourier transformed in two dimensions to form the desired image. The stabilized data is transferred to a two-dimensional interpolator 30 which produces a rectilinear image signal by weighting the points surrounding a desired data point using a weighting function such as SIN X/X centered on the desired point. The rectilinear signal is applied to a two-dimensional Fast Fourier Transform (FT) device 32 such as convnetional a digital filter bank. The image produced by the FFT device 32 can be recorded or displayed on a display 34. If the imaged field is large and the resolution is very fine, the interpolator 30 and FFT 32 may be replicated to serve sub-images.

As discussed above, high resolution image data exhibits substantial range migration which must be corrected before the image can be formed. This is normally done by polar format processing, of which the two-dimensional interpolator 30 is a significant part. This interpolator 30 requires a very significant amount of computation time because the weighting function is applied twice to determine each desired point and contributes substantially to processor 12 size.

The stabilized data leaving the map reference function 28 is of the form:

$$S(L,K) = \sum_n E_n\, e^{-j[u(L,K)*x_n + v(L,K)*y_n]} \tag{2}$$

where:

$$u(L,K) = \left[\frac{4\pi F}{C} + \frac{4\pi k}{C}\left[\frac{K}{Fad} - \frac{2R(L)}{C}\right]\right]\sin(Y(L)) \tag{3}$$

and $$\frac{u(L,K)}{v(L,K)} = \text{TAN}(Y(L)) \tag{4}$$

where L is the pulse number, F is the transmit frequency, k is the linear FM slope, K is the sample number, R is the range to image center for pulse L, C is the speed of light, Y is the rotation angle for pulse L, $x_n$, $y_n$ are the azimuth and range locations of the n'th scatterer, and $E_n$ is the vector magnitude of the n'th scatterer.

FIG. 2A is a mapping in u-v coordinates (the u-v plane) of the location of samples S1-S5 and pulses P1-P8 produced over the integration or exposure angle $\Delta\Theta$ traversed by the sensor 10. A complex number representing the stabilized data is associated with each of these points which extend radially from the origin of the u-v plane; hence the name "Polar Format". Equation (2) indicates that if u and v are selected orthogonally and with even spacing, the data can be directly transformed to produce the image which is a mapping of vector intensity in x-y coordinates. This is approximately the case for small, coarse resolution images. The conventional polar format algorithm uses two dimensional interpolation to form a new data set from that present at the map reference output. The original data points and their location on the u-v plane are identified in terms of pulse L and sample K, as expressed in equation (2). The new data points are defined in terms of Ju and Jv (=1,2,3—), as shown in FIG. 2B. The resultant signal is:

$$S(Ju,Jv) = \sum_n E_n e^{-j[(Uo+Ju\,u)xn+(Vo+Jv\,v)yn]} \quad (5)$$

for $Ju, Jv = 1,2,3, \ldots$

The Fourier transform of this signal in terms of variables Ju and Jv yields the vector magnitude of scatterers in terms of their x,y location in the image field and is the desired high resolution image.

Interpolation used in the conventional polar format algorithm requires a large amount of computation since each new data point requires two weighted complex Fourier transforms of typically 8 to 16 points each. A 500 by 500 element map; which is a modest size, requires 500 * 500 * 2 = 500,000 FFT's for the interpolator 30. This is a significant processing burden.

SUMMARY OF THE INVENTION

It is an object of the present invention to reduce the number of computations required to produce an image in a high resolution radar system.

It is another object of the present invention to simplify signal processing of the received radar signal.

It is an additional object of the present invention to reduce the size and/or complexity of the signal processor for the return echoes of the radar signal.

It is a further object of the present invention to prebias the transmitted signal to reduce return signal processing load.

The present invention accomplishes the above objects by providing an apparatus that prebiases the transmitted signal to remove the need for processing in one dimension. The system uses a map function generator to produce small frequency (phase) changes in the transmitted signal during each pulse over the entire integration or exposure period which produces a dimensionally transformed return signal that only requires interpolation in a single dimension.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention is a prebiasing apparatus for high resolution imaging radar which substantially reduces the number of computations required for polar format processing to compensate for the range migration phenomenon. The present invention reduces the size of the signal processor required to provide a desired resolution and field size, and improves image construction speed. Processor size reduction is particularly important for applications where the processing is to be done on board the sensor platform, or where multiple portable processors are deployed with data links from the sensor.

Figure 1:
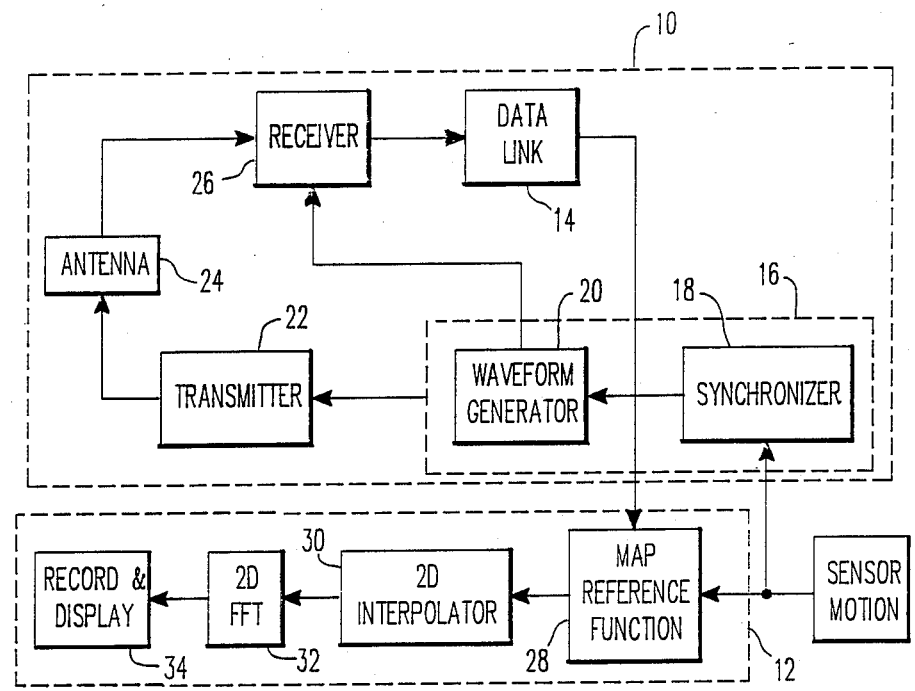
FIG. 1 illustrates a conventional high resolution radar system.
Figure 2A:
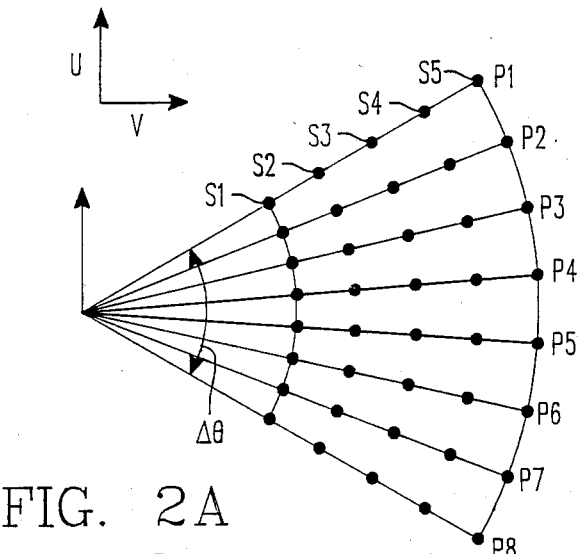
FIGS. 2A and 2B illustrate the polar to rectilinear two dimensional transformation required in the conventional system of FIG. 1.
Figure 2B:
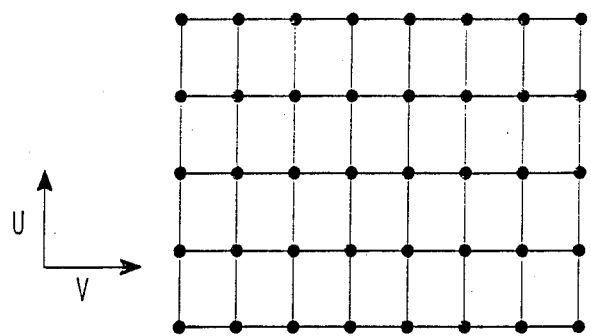
Figure 3:
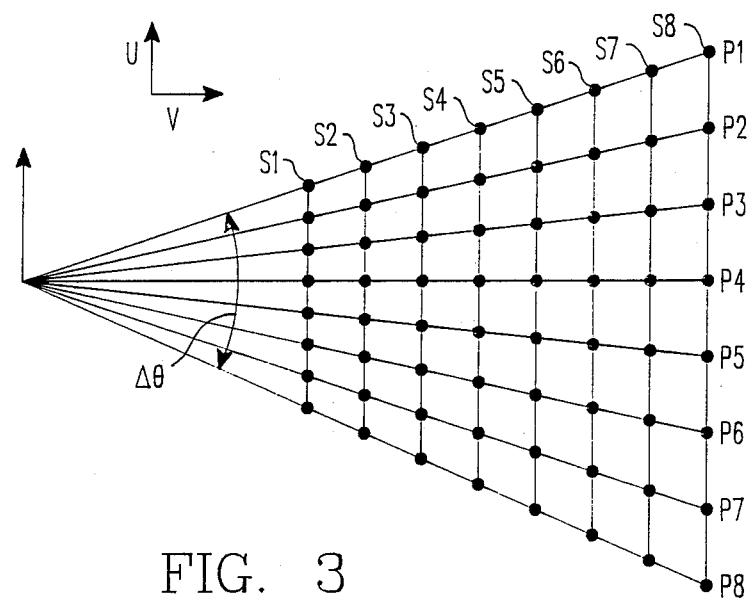
FIG. 3 illustrates the result of the transmit signal prebias provided by the present invention.

The principle on which the present invention is based is illustrated in FIG. 3. If the transmit signal is properly biased, the data gathered will be aligned and in parallel with the u-axis such that a one dimensional interpolator will suffice for the processing to convert the samples into the rectilinear array of FIG. 2B. The significance of this is illustrated by the previous example of a 500 by 500 data array which requires 500,000 FFT's to prepare the data for the image display. The invention eliminates the need for half or 250,000 of these FFT's which is a very significant processor savings.

Figure 4:
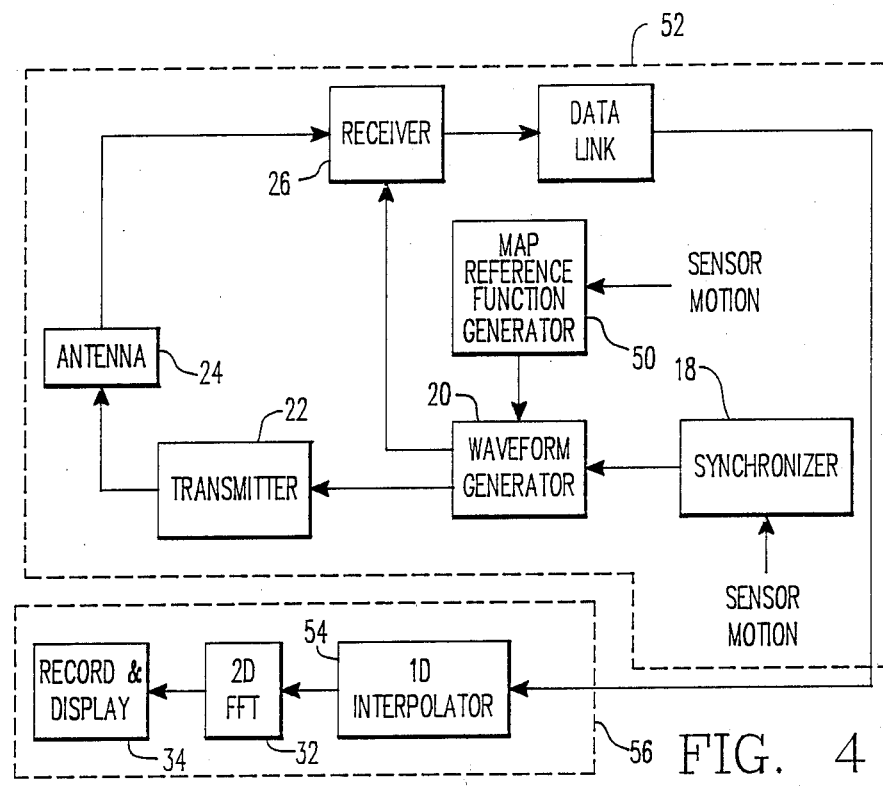
FIG. 4 illustrates a high resolution radar system in accordance with the present invention.

Placing a modified map reference function generator 50 in the sensor 52, as illustrated in FIG. 4, is the key to collecting data that requires only one dimension of interpolation. The map reference function modifies the transmit waveform for each pulse such that the samples of the received signals are automatically aligned and in parallel with the u-axis in the u-v plane, as shown in FIG. 3. The resultant data exactly matches that produced by the range interpolation portion of the two dimensional interpolator 30 in the conventional system. This alignment can be accomplished by modifying the parameters of the transmit waveform on a pulse to pulse basis and in fine increments. The conventional map reference applied to the receive signal cannot expand or compress the composite return, which is the essence of the inerpolation process. Using an appropriate map reference function on the transmit signal in the sensor 52 enables the transmitted signal to be effectively expanded or compressed. This pulse to pulse modification of the transmit waveform, when properly applied, forces the desired alignment of the received data in the u-v plane.

The map reference function generator 50 modifies the waveform produced by the conventional wavefornm generator 20/synchronizer 18 combination before it is applied to transmitter 22. The return signal received by antenna 24 is demodulated by receiver 26 and transmitted through data link 14 to a one dimensional interpolator 54 in signal processor 56. The signal processor 56 used in the prior art will be sufficient for the one-dimensional interpolation. The output of the one-dimensional interpolator 54 is applied to the conventional two-dimensional FFT and then displayed.

Figure 5:
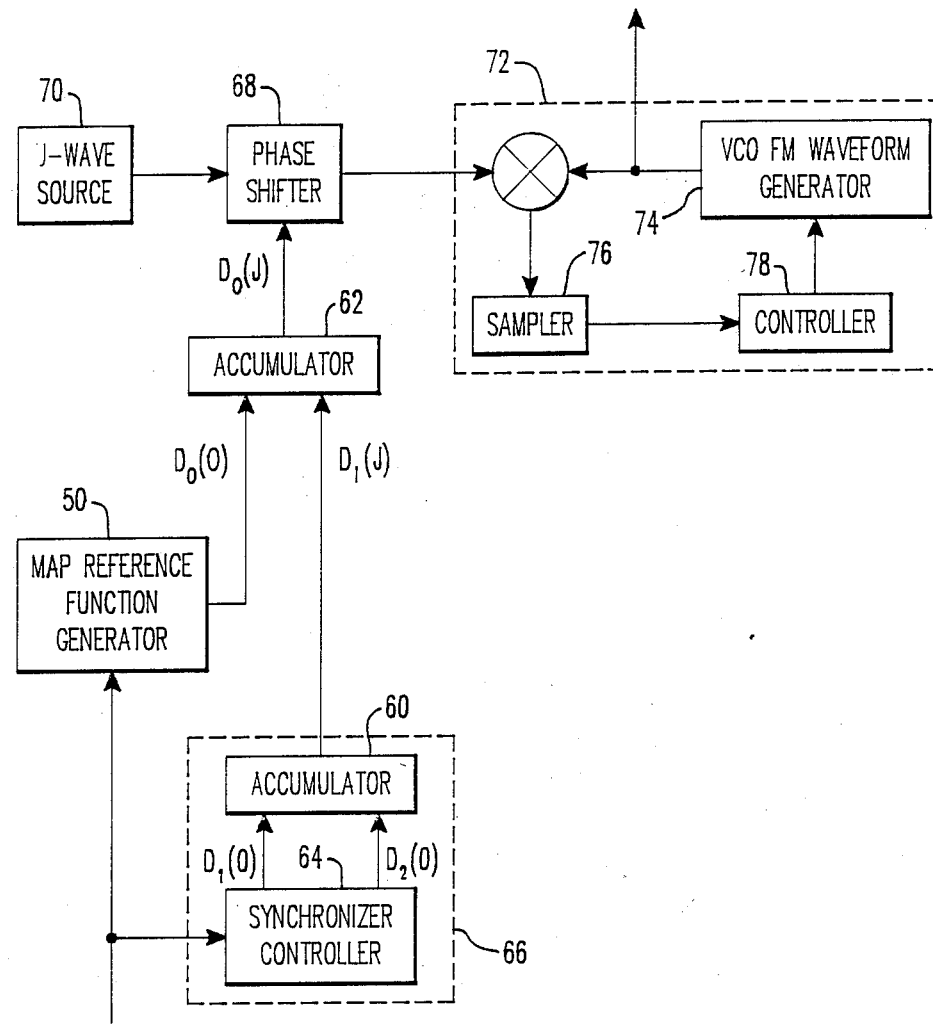
FIG. 5 illustrates a portion of FIG. 4 in more detail.

The present invention produces a precisely controlled quadratic phase function using a cascade of digital accumulators 60 and 62, as illustrated in FIG. 5. The accumulator 60 controlled by synchronizar controller 64 forms a synchronizer 66 as illustrated in detail in FIG. 6 of U.S. Pat. No. 4,160,958. The output of synchronizer 66 is combined with the output from map reference function generator 50 in accumulator 62 to drive a phase shifter 68.

The accumulators 60 and 62 are characterized by the expressions:

$$D_0(J + 1) = D_0(J) + D_1(J) \quad (6)$$

$$D_1(J + 1) = D_1(J) + D_2(J) \quad (7)$$

$$D_2(J + 1) = D_2(J) \quad (8)$$

$$D_0(J) = D_0(0) + J^*(D_1(0) - D_2(0)/2) + J^{2*} D_2(0)/2 \quad (9)$$

where $D_0(J)$ is the output to phase shifter 68 for clock J, $D_1(J)$ and $D_2(J)$ are the other accumulator signals, $D_0(0)$, $D_1(0)$, $D_2(0)$ are the phase, frequency, and slope input initial conditions for $J=0$, $D_0(0)$ is the initial condition of the prebias and $D_1(0)$ and $D_2(0)$ are initial conditions of the LFM signal as described in U.S. Pat. No. 4,160,958. $D_1(J)$ functions as an LFM control signal and $D_0(0)$ as a bias control signal. From these expressions, it can be seen that the waveform parameters are completely defined by the accumulator initial conditions, which are started at the desired clock time and must carry enough bits for the required precision. These accumulators 60 and 62 are the same as those used in the conventional map reference generator and carry the same precision but operate at a higher clock rate because of waveform generator stability considerations as discussed below. The accumulator initial conditions are calculated for each pulse from sensor motion as derived from the sensor platform navigation system, and from the orientation of the image relative to the sensor path. These computations are similar to those performed in the conventional system of U.S. Pat. No. 4,160,958 and use data from the same sources. The accumulators 60 and 62 output a quadratic digital word progression. The slope, initial phase and frequency are controlled by the accumulator initial conditions which are updated pulse to pulse and between transmit and receive. The output of accumulator 62 drives the binary microwave phase shifter 68 (typically 7 or 8 bits) to produce a quadratic phase progression which is updated at the accumulator clock rate (typically 20 MHz). The phase shifter 68 operates on a table, fixed frequency microwave signal from source 70 to produce the reference signal for a wideband sampled phase locked loop 72. The desired wideband LFM signal is produced by a microwave voltage controlled oscillator (VCO) 74 which operates at the receiver freuqency and is offset with respect to the transmit frequency. The VCO 74 is phase locked to the phase shifter 68 output with a wideband loop which is sampled by sampler 76 with a very narrow aperture commensurate with the desired LFM bandwidth. The phase locked loop 72 serves as a tracking filter which smooths the waveform to produce a pure, undistorted signal. The source 70, shifter 68 and phase locked loop 72 are disclosed in detail in U.S. Pat. No. 4,160,958.

Figure 6:
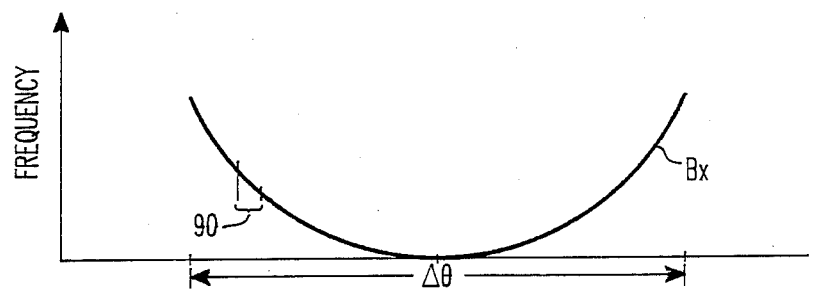
FIG. 6 illustrates the waveform used to modify the transmit frequency during an image integration period in accordance with the present invention.

The map reference function produced by the generator 50 is illustrated in FIG. 6. This function Bx is a parabolic function as defined by equation (10) below.

$$Bx = \Delta\Theta 2/8F_0 \quad (10)$$

where the value of Bx is the frequency (phase) change of the transmit signal $F_0$ and the integration period $\Delta\Theta$ is the angle, for example, 3.6°, through which the sensor must move to provide the needed resolution. Based on the altitude and the speed of the sensor platform, the time period of the integration period $\Delta\Theta$ can be determined. The integration period $\Delta\Theta$ should be divided into segments 90 which correspond to the change required in each transmit pulse. If each segment 90 of the function Bx is integrated, the phase change that must be made in the pulse will be produced. By integrating the entire waveform the phase changes and pulse initial conditions for all pulses can be produced. With the phase change and the integration time period known the phase change over each pulse can be precisely determined. The changes associated with each pulse can be approximated as straight line segments of the function Bx. The phase at the beginning of each straight line segment being the initial conditions. This function Bx can, to sufficient appropriate accuracy, be produced by the map reference function generator 50 producing a signal of constant slope during each pulse with the slope changing from pulse to pulse. The map reference function generator 50 can be a prior art synchronizer designed to produce the appropriately sloped output values based on the starting initial conditions for each pulse or can be a high speed read only memory or even a high speed microprocessor.

The many features and advantges of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents maybe resorted to, falling within the scope of the invention.

What we claim is:

1. A signal transformation apparatus for a radar system that controls transmit frequency of each radar pulse with a phase shifter, said apparatus comprising:
   modulation means for providing a modulation control signal;
   preinterpolation means for providing a biasing control signal eliminating a dimension of processing of a received signal by causing dimensional transformation of the transmitted and received signal so that the received signal is aligned in one dimension with one axis of the received signal image mapping coordinates; and
   combining means for combining the biasing control signal and the modulation control signal as an output to the phase shifter.

2. An apparatus as recited in claim 1, wherein said preinterpolation means provides a parabolic shaped biasing control signal during an image integration period.

3. An apparatus as recited in claim 1, wherein said modulation means comprises a first linear frequency modulation synchronizer provided with an initial condition setting for linear modulation, said preinterpolation means comprises a second linear frequency modulation synchronizer with a changeable slope and initial condition output and said combining means comprises an accumulator connected to said first and second synchronizers and the phase shifter.

4. An apparatus as recited in claim 1, wherein said combining means produces a signal $D_0(J) = D_0(0) + J*(D_1(0) - D_2(0)/2) + J^2*D_2(0)/2$, where $D_0(0)$ is the initial condition of the parabolic bias signal for each radar pulse, $D_1(0)$ and $D_2(0)$ are initial conditions of the frequency modulation control signal and J is the value of a reference clock.

5. A radar system, comprising:
waveform generator means for producing radar signals with a phase being controlled by a signal $D_0(J) = D_0(0) + J*(D_1(0) - D_2(0)/2) + J^2*D_2(0)/2$, where $D_0(0)$ is an initial condition of a parabolic bias signal for each radar pulse, $D_1(0)$ and $D_2(0)$ are initial conditions of a linear frequency modulation control signal and J is a value of a reference clock;
trasmit/receive means for transmitting the radar signals and receiving return signals;
interpolator means for one dimensionally interpolating the return signals; and
display means for displaying the interpolated return signals.

6. A signal transformation apparatus for a radar system that controls transmit frequency of each radar pulse with a phase shifter, said apparatus comprising:
modulation means for providing a modulation control signal;
preinterpolation means for providing a biasing control signal eliminating a dimension of processing of a received signal, where said preinterpolation means provides a parabolic shaped biasing control signal curing an image integration period; and
combining means for combining the biasing control signal and the modulation control signal as an ouptut to the phase shifter.

* * * * *